US011099130B1

(12) United States Patent
Pérez Millán et al.

(10) Patent No.: US 11,099,130 B1
(45) Date of Patent: Aug. 24, 2021

(54) LIGHT INSPECTION SYSTEM AND METHOD OF THE SURFACE AND INSIDE OF A SAMPLE

(71) Applicant: FYLA LASER, S.L., Valencia (ES)

(72) Inventors: Pere Pérez Millán, Valencia (ES); Salvador Torres Peiró, Valencia (ES); Javier Abreu Afonso, Valencia (ES); Héctor Muñoz Marco, Valencia (ES); Viorel Otgon, Valencia (ES)

(73) Assignee: FYLA LASER, S.L., Paterna (ES)

( * ) Notice: Subject to any disclaimer, the term of this patent is extended or adjusted under 35 U.S.C. 154(b) by 145 days.

(21) Appl. No.: 16/622,456

(22) PCT Filed: Jun. 29, 2018

(86) PCT No.: PCT/IB2018/054846
§ 371 (c)(1),
(2) Date: Dec. 13, 2019

(87) PCT Pub. No.: WO2019/008486
PCT Pub. Date: Jan. 10, 2019

(30) Foreign Application Priority Data

Jul. 3, 2017 (EP) .................................... 17382427

(51) Int. Cl.
*G01N 21/47* (2006.01)
(52) U.S. Cl.
CPC ..... *G01N 21/474* (2013.01); *G01N 2021/475* (2013.01); *G01N 2021/4747* (2013.01); *G01N 2021/4773* (2013.01)
(58) Field of Classification Search
CPC .................. G01N 21/474; G01N 21/49; G01N 2021/4747; G01N 2201/105;
(Continued)

(56) References Cited

U.S. PATENT DOCUMENTS

| 4,776,695 A | * | 10/1988 | van Pham | G01B 11/0633 356/308 |
| 5,293,872 A | * | 3/1994 | Alfano | A61B 5/0071 600/475 |

(Continued)

FOREIGN PATENT DOCUMENTS

| EP | 0822394 A2 | 2/1998 |
| EP | 1959250 A1 | 8/2008 |

(Continued)

OTHER PUBLICATIONS

International Search Report and Written Opinion of the International Searching Authority dated Aug. 14, 2018 in corresponding International application No. PCT/IB2018/054846; 11 pages.

*Primary Examiner* — Sang H Nguyen
(74) *Attorney, Agent, or Firm* — Maier & Maier, PLLC

(57) ABSTRACT

A light inspection system and method of the surface and inside of a sample. The system includes a light source generating a light beam to impinge on a sample; an imaging system obtaining an image of said sample and including a parabolic mirror with a hole to allow the passage of the light beam towards the sample, and the redirection of a scattered light component of the sample towards a light capturing unit comprising a bundle of bifurcated fibers; the bundle of fibers having a central fiber and external fibers, the central fiber receiving scattered light from the surface and the external fibers receiving scattered light from inside the sample; a measuring system measuring a power and/or a spectrum collected in the central and the external fibers.

14 Claims, 5 Drawing Sheets

(58) Field of Classification Search
CPC ..... G01N 2021/475; G01N 2021/4742; G01N 2021/4773
See application file for complete search history.

(56) References Cited

U.S. PATENT DOCUMENTS

| | | | | |
|---|---|---|---|---|
| 6,038,067 A | * | 3/2000 | George | G02B 21/0028 |
| | | | | 359/368 |
| 6,241,663 B1 | * | 6/2001 | Wu | A61B 5/14532 |
| | | | | 600/310 |
| 6,353,226 B1 | * | 3/2002 | Khalil | A61B 5/14532 |
| | | | | 250/339.11 |
| 6,753,966 B2 | | 6/2004 | Von Rosenberg | |
| 7,830,519 B2 | | 11/2010 | Mah et al. | |
| 2003/0030850 A1 | | 2/2003 | Heffelfinger et al. | |
| 2007/0115468 A1 | * | 5/2007 | Barnard | H01J 37/29 |
| | | | | 356/300 |
| 2007/0229832 A1 | | 10/2007 | Maeda | |
| 2008/0097174 A1 | * | 4/2008 | Maynard | G01N 21/6408 |
| | | | | 600/316 |
| 2008/0174767 A1 | | 7/2008 | Leonard et al. | |
| 2010/0027029 A1 | * | 2/2010 | Nebosis | G01B 9/02012 |
| | | | | 356/497 |
| 2012/0049085 A1 | * | 3/2012 | Sappey | G01J 3/4412 |
| | | | | 250/459.1 |
| 2014/0217288 A1 | * | 8/2014 | Kamata | G02B 13/14 |
| | | | | 250/338.4 |
| 2015/0062573 A1 | | 3/2015 | Liu et al. | |
| 2015/0157199 A1 | * | 6/2015 | Sapiens | A61B 3/0008 |
| | | | | 351/214 |
| 2016/0084709 A1 | * | 3/2016 | Day | G01N 21/718 |
| | | | | 356/318 |
| 2016/0277723 A1 | * | 9/2016 | Lee | G01B 11/2441 |

FOREIGN PATENT DOCUMENTS

| | | |
|---|---|---|
| EP | 2200758 B1 | 1/2014 |
| WO | 9201923 A1 | 2/1992 |

\* cited by examiner

LIGHT INSPECTION SYSTEM AND METHOD OF THE SURFACE AND INSIDE OF A SAMPLE

FIELD

The present invention is directed, in general, to the field of optical systems and methods for measuring properties of a sample, allowing inspecting the sample in a non-destructive manner. In particular, the invention relates to a light inspecting system and method of the surface and inside of a sample, for example, food, recycling or wood products, a mineral, etc.

BACKGROUND

Patent EP 2200758 concerns a method and a sorting apparatus for detecting irregularities in a product, in which at least one light beam is directed towards this product by means of a moving mirror, whereby the product moves in a particular direction through a detection zone, so that said light beam, which preferably moves transversely across the path of the product, is at least partially scattered and/or reflected by said product. The scattered and/or the reflected light is detected by at least one detector in order to characterize and to sort the product.

U.S. Pat. No. 7,830,519 discloses a device for non-invasively measuring concentration of one or more analytes in a living subject or a biological sample, wherein the device includes several light sources, a system for controlling the timing and intensity of the light source outputs, a system for passing the light through the subject or sample, a system for measuring the amount of light transmitted, and a system for relating the measurement to the concentration of the analyte in question. The light sources are narrow band sources at different wavelengths, and are capable of being rapidly switched between two levels of intensity. The number of light sources required and the wavelengths of the sources are dependent upon the specific analyte being measured.

U.S. Pat. No. 6,753,966 relates to spectral analysis systems and methods for determining physical and chemical properties of a sample by measuring the optical characteristics of light emitted from the sample. In one embodiment, a probe head for use with a spectrometer includes a reflector for illuminating a sample volume disposed circumferentially about the light source of the probe head. In another embodiment, a probe head includes an optical blocking element for forcing the optical path between the light source and an optical pick-up optically connected to the spectrometer into the sample. The probe head also includes a reference shutter for selectively blocking light emitted from the sample from reaching the optical pick-up to facilitate calibration of the spectrometer.

Patent EP 0822394 relates to a photodetection device which can eliminate a drift or a random noise component from a feeble measuring signal and amplify the signal at a high signal-to-noise ratio suitable to be used in a measuring device for optically measuring a specific substance such as glucose or hemoglobin in blood or urine or sugar in a fruit, for example, contained in a scattering substance such as a liquid, food or a human body.

Patent application US 2007/0229832 relates to a method and an apparatus for, in order to inspect and sort external qualities and internal qualities of agricultural products or the like, inspecting, in a non-destructive manner, component values such as a sugar degree and an acid degree and internal qualities such as internal diseases and defects and physiological defects that cannot be found in appearance of objects such as the agricultural products by projecting beams to objects, which are conveyed one by one in a line by various conveying means, from both left and right sides of a conveying path in inspection positions of predetermined positions of the conveying path using plural floodlight lamps, condensing and receiving transmitted light exiting to an upper side and a lower side through the insides of the objects, and applying spectral analysis to the transmitted light.

Patent application EP 1959250 discloses an analyzing apparatus having a structure for enabling spectrometry to a longer frequency region while being excellent in practicality. The analyzing apparatus comprises a light source section and a light-detecting section. The light source section includes a seed light source emitting laser light, and a solid highly nonlinear optical fiber generating supercontinuum light in response to the input of the laser light, and thereby emitting the supercontinuum light as irradiation light to an object. The light-detecting section detects light to be detected from the object irradiated with the irradiation light.

Patent application US 2015/062573 provides an optical detection device including an optics arrangement configured to generate an annular illumination pattern to illuminate a portion of a sample and further configured to receive a return light from the portion of the sample illuminated by the annular illumination pattern. Moreover, a detector arrangement configured to detect the return light is also included.

Patent application US 2003/030850 discloses a system for optical interrogation of a sample adaptable for multiple wavelength illumination and multiple wavelength fluorescent or luminescent light collection, wherein the illumination wavelength profile and the light collection profile may overlap. In the system, coherent light from one or more lasers is focused onto a target layer on a sample to excite fluorescent or luminescent light from the target layer. Emitted light is collected from a selected depth by a reflective light collector that transmits the collected light to detection optics. The reflective light collector directs collected light at an angle to the optical axis of the illumination light, thereby separating collected emitted light from illumination light. The light collector may collect light from a focus, whereby the focused illumination light combined with the focused light collection aid in limitation of the depth of field to a selected depth. Additionally, a spatial filter positioned between the light collector and the detection optics may be used to confine the depth of field to a selected depth. This device may be incorporated into an optical scanner by scanning of illumination light in a first direction and translation of the sample in a tangent direction. Alternatively, the illumination and detection optics may remain stationary and the detectable targets moved past a scanning location (e.g. as in electrophoretic analysis).

Patent application US 2008/174767 discloses an optical system for achieving enhanced rejection of scattered excitation light and superior signal-to-noise performance when reading microplate wells. The optical system uses an axial configuration in which the excitation beam incident upon the sample propagates along the axis of the microplate well. Excitation light from a light source, such as a lamp or fiber optic bundle, is collimated into a beam using a lens. A reflective pick-off mirror is then used to reflect the collimated excitation beam upward along the well axis. A focusing lens, with a diameter exceeding the diameter of the collimated excitation beam, is used to focus the excitation beam in the well. The same broad lens is used to collimate the emitted fluorescent light, of which a large percentage propagates axially past the pick-off mirror towards a second focusing lens that focuses the emission beam onto the face of a fiber optic bundle. The emitted light is later filtered and detected using at a position that is optically shielded from the aforementioned optical system. The optical system is incorporated into a microplate reader or automated assay instrument in order to provide a compact assembly for sensitive fluorescence measurements either above or below the microplate. The optical system further enables the simultaneous measurement of absorbance and fluorescence in a compact optical configuration.

Other optical systems for measuring optical parameters of a sample are known by WO 92/01923 and U.S. Pat. No. 6,353,226 documents.

However, none of the cited prior art documents provides or discloses a light reception system, and method, that allows simultaneously discriminating the light scattered from the surface of a sample of the light scattered from the inside of said sample. Therefore, the prior art solutions cannot capture and accurately distinguish the differentiated properties of either part of the sample.

SUMMARY

To that end, present invention provides, according to one aspect, a light inspection system of the surface and inside of a sample, the system comprising:

- a light source configured to generate a light beam having a broadband spectrum at a given optical power to impinge on a sample (e.g. a fruit or a vegetable, among others) located at a given distance, said sample having a given translucency and absorption coefficients;
- a light capturing unit including a bundle of bifurcated fibers comprised of a central fiber and one external fiber or a plurality of external fibers; and
- an imaging system configured to obtain an image of said sample upon said impingement, said imaging system comprising a parabolic mirror with a hole allowing the passage of the light beam towards the sample via the hole, the redirection of a scattered light component of the sample towards a light capturing unit, and the elimination of the light coming from a direct reflection at the sample through said hole;
- wherein said central fiber of the light capturing unit being positioned to receive scattered light at least from the surface of the sample and said external fiber or plurality of external fibers being positioned at a distance of said central to receive scattered light exclusively from inside the sample; and
- a measuring system configured to measure a power and/or a spectrum collected independently in the central fiber and in the external fiber or the plurality of external fibers.

According to the proposed system, said image of the sample is obtained, approximately, at a transversal plane with regard to the axis of each of the fibers of the bundle of bifurcated fibers. That is, a focal length of the parabolic mirror, the length from the parabolic mirror to the sample and the length from the parabolic mirror to the bundle of bifurcated fibers are selected such that the image of the sample is formed in the transversal plane of the fiber bundle input.

Therefore, the proposed system allows discriminating the light scattered from the surface of the sample of the light scattered from the inside of said sample.

Preferably, the parabolic mirror is concave and has a focal length of approximately 101 millimeters with a 90° configuration.

In an embodiment, the bundle of bifurcated fibers comprises a plurality of external fibers, preferably comprising at least three fibers, in an annular formation around said central fiber. The plurality of external fibers in this embodiment is located at a same distance from the central fiber.

In an embodiment, the measuring system includes a spectrometer and a power measuring device each one adapted for measuring said power and said spectrum in the central fiber and in the external fiber or the plurality of external fibers, independently, and also simultaneously (if considered necessary).

The light source may include any of: a supercontinuum laser light source comprising a light wavelength between 450 and 2400 nm; a visible enhanced supercontinuum source comprising a light wavelength below 450 nm; or a supercontinuum laser based in soft-glasses photonic crystal fibers providing emission ranges from 2 µm to 13 µm.

Besides, the light source may comprise a multiwavelength light source.

According to an embodiment, the system also includes one or more filters, located between the parabolic mirror and the sample, and configured to select a wavelength of the scattered light from the sample.

According to another embodiment, the imaging system further includes an optical device such as a galvanometric mirror or a polygonal rotating mirror, located between the parabolic mirror and the sample, and configured to change and orient the direction of the light beam towards the sample. The system may also include one or more filters, located between the light source and the optical device, and configured to excite the sample with light of arbitrary spectral shape.

Embodiments of the present invention also provide, according to another aspect, a light inspection method of the surface and inside of a sample. The method comprises generating, by a light source, a light beam having a broadband spectrum at a given optical power to impinge on a sample located at a given distance, said sample comprising a given translucency and absorption coefficients; obtaining, at a traversal plane of a bundle of bifurcated fibers, an image of said sample upon said impingement by an imaging system comprising a parabolic mirror with a hole, said parabolic mirror allowing the passage of the light beam towards the sample through said hole; redirecting, by the parabolic mirror, a scattered light component of the sample towards said bundle of bifurcated fibers, said bundle of bifurcated fibers being comprised of a central fiber and one external fiber or a plurality of external fibers; eliminating, by the parabolic mirror, the light coming from direct reflection at the sample through said hole; receiving scattered light from at least the surface of the sample by said central fiber of the bundle of bifurcated fibers; receiving scattered light exclusively from inside of the sample by said external fiber or by said plurality of external fibers of the bundle of bifurcated fibers; and measuring, by a measuring system, a power and/or a spectrum collected in the central fiber and in the external fiber or the plurality of external fibers, independently.

According to the proposed method, the sample may comprise any of a food such as a fruit or a vegetable, a recycling material or product, a wood material or product, a metal, a biological tissue, a textile, a plastic, a drug or medicine, a mineral, among others.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION

Figure 1:
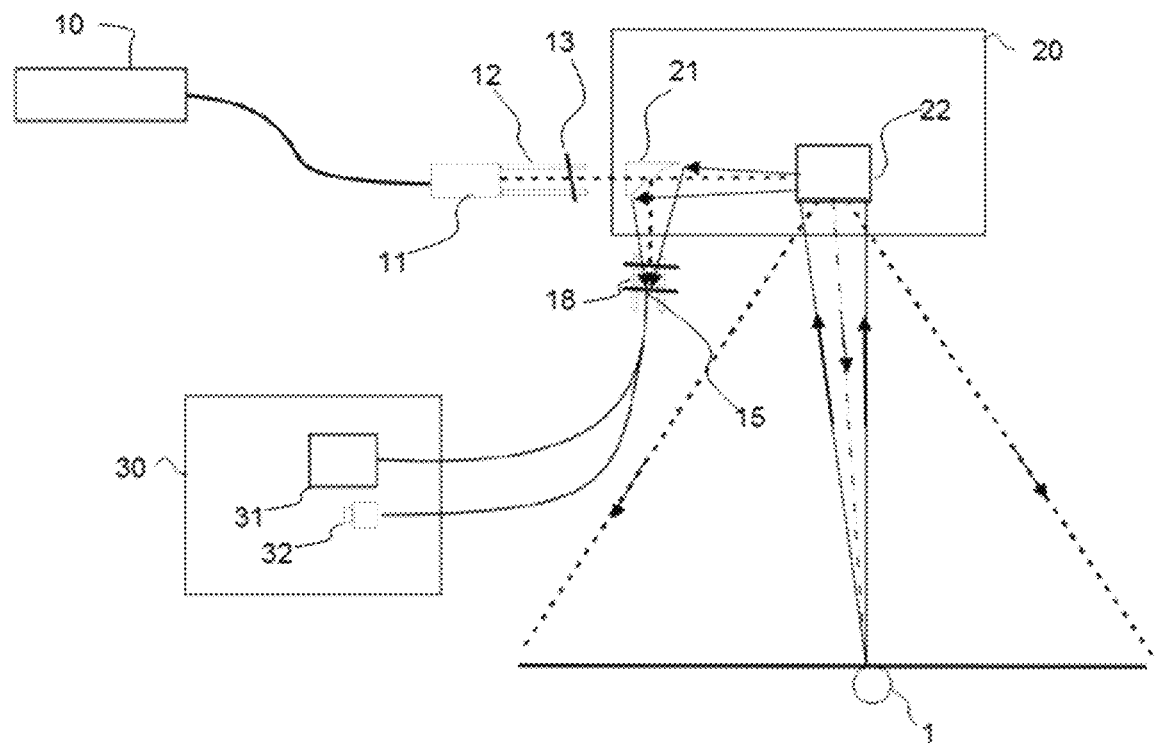
FIG. 1 is a schematic illustration of a light inspection system of the surface and inside of a sample in order to discriminate the light scattered from the surface of the sample of the light scattered from the inside of said sample, according to a preferred embodiment of the present invention.

FIG. 1 shows a preferred embodiment of the proposed system. According to the present invention the sample 1 can be any of a food product (e.g. fruit or vegetables), a recycling product, a metal, a biological tissue, a wood product, a plastic, a drug or even a mineral, with a given translucency and absorption coefficients.

Figure 2:
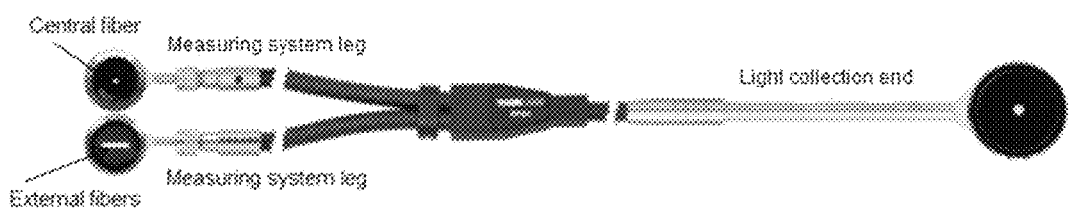
FIG. 2 illustrates an example of a round-to-linear configuration that can be used by present invention, in accordance with an embodiment.

According to the preferred embodiment, the proposed system includes a light source 10 configured to generate a light beam with a broadband spectrum at a given optical power to impinge on the sample 1; an imaging system 20 configured to obtain an image of the sample upon said impingement; a light capturing unit comprising a bundle of bifurcated fibers 15 sustained by a holder 18, i.e. a number of fibers positioned side-by-side in a common end and split out into two legs at the other end (see FIG. 2), being the fiber type used in each leg the same or different; and a measuring system 30. The system (optionally) also includes a collimator 11, a holder 12, a filter 13.

Preferably, the light source has multiple wavelengths. The light source 10 may be any of a supercontinuum laser light source having a light wavelength between 450 and 2400 nm, a visible enhanced supercontinuum source having a light wavelength below 450 nm or a supercontinuum laser based in soft-glasses photonic crystal fibers providing emission ranges from 2 µm to 13 µm. Even, the light source 10 could be a traditional broadband source such as a lamp, a superluminiscent diode (SLED), a white LED, etc. However, and because the power levels of the traditional broadband sources are lower supercontinuum light sources are preferred.

According to this preferred embodiment, the imaging system 20 comprises a parabolic mirror 21 with a hole and an optical device 22 such as galvanometric mirror or a polygonal rotating mirror capable to direct the light beam towards the sample 1. It should be noted that the optical device 22 is optional in the system architecture. That is, in alternative embodiments of the proposed system, in this case not illustrated, the imaging system 20 is formed only by the parabolic mirror 21.

The parabolic mirror 21 is adapted and configured such that it allows: the passage of the light beam towards the sample 1, the redirection of the scattered light component of the sample 1 towards the bundle of bifurcated fibers 15, and the elimination of the light coming from direct reflection at the sample 1. Preferably, the parabolic mirror 21 is concave and has a focal length of approximately 101 millimeters with a 90° configuration. The optical device 22 is adapted and configured to change and orient the direction of the light beam towards the sample 1.

Figure 3:
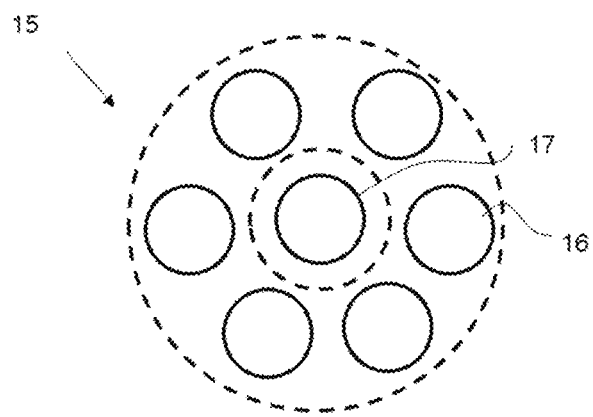
FIG. 3 illustrates an example of the transversal section of the bundle of bifurcated fibers used in the proposed system.

Referring now to FIG. 3, therein it is illustrated an example of the transversal plane of the common end of the bundle of bifurcated fibers 15. As can be seen, the bundle is formed by a central fiber 17 and a plurality of external fibers 16 in an annular formation around said central fiber 17. In this particular case, six external fibers 16 are used (i.e. 6-around-1 fiber bundle in a round-to-linear configuration), therefore the light received by the measuring system 30 from the external fibers 16 is maximized. However, it should be noted that the invention can work with any arrangement of external fibers 16; even a single external fiber 16 can be used.

The central fiber 17 is positioned to receive scattered light mainly from the surface of the sample 1. It should be noted that the central fiber 17 can also receive scattered light from the inside of the sample 1. The external fibers 16 are positioned to receive scattered light exclusively from inside the sample. Preferably, all the external fibers 16 of the bundle 15 are located at the same distance from the central fiber 17.

Referring back to FIG. 1, according to said preferred embodiment, the measuring system 30 comprises a spectrometer 31 and a power measuring device 32 to independently measure the spectrum and/or the power of the central fiber 17 and of the external fibers 16. In this case, the single end of the bifurcated fiber is used for scattered light collection while the two separate legs are connected to the spectrometer 31 and the power measuring device 32. Alternatively, a single device could be used to measure both parameters.

The system of FIG. 1 may also comprise one or more filters (e.g. filter 13) to excite the sample 1 with light of arbitrary spectral shape: lowpass, bandpass and/or highpass filters. The one or more filters can be placed at any position between light source 10 and optical device 22.

In another embodiment, the system may also comprise filters to select wavelength of the scattered light from the sample 1. For example, lowpass, bandpass and/or highpass filters, positioned between parabolic mirror 21 and fiber bundle 15. Also dispersive elements in these positions like prisms and diffractive gratings to discriminate wavelengths can be also used.

Figure 4:
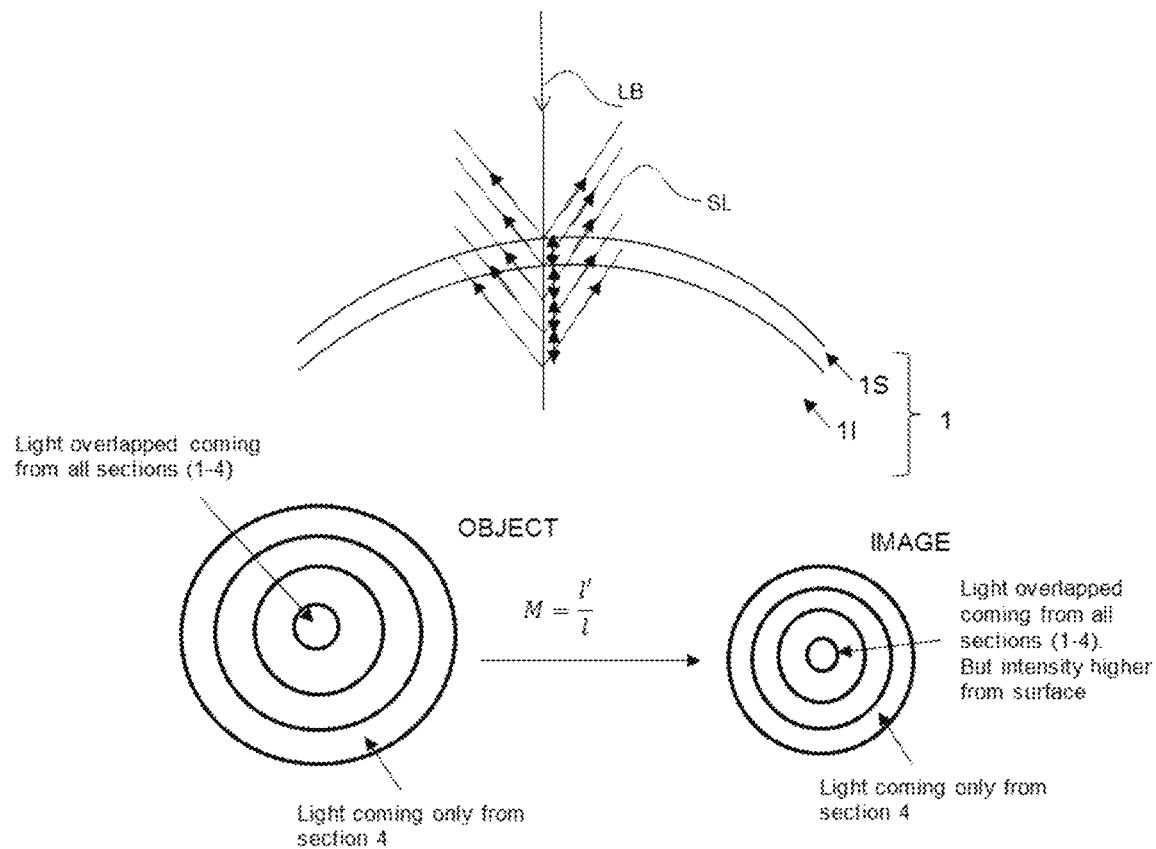
FIG. 4 schematically illustrates an example of a cone of light from inside a sample (seen in cross-section and from above) to show how scattered light coming from the inside of the sample is discriminated from scattered light coming from the surface of the sample.

FIG. 4 exemplary illustrates how scattered light SL coming from the inside 11 of the sample 1 is discriminated from scattered light SL coming from the surface 1S of the sample 1. On top of the figure it is shown how light from the inside 11 and from the surface 1S of the sample 1 is scattered upon impingement of a light beam LB. The bottom of the figure represents the transversal structure of the light at the object and the image plane of the system of formation of images, taking into account an arbitrary magnitude factor M=, where l' is the distance from the center of the parabolic mirror 21 to the collecting end of the fiber bundle 15, and/is the distance from the center of the parabolic mirror 21 to the surface of the sample 1 (following the optical path of the laser beam). The object plane corresponds to the plane which is tangent to the surface of the sample 1 and normal to the laser beam path.

Figure 5:
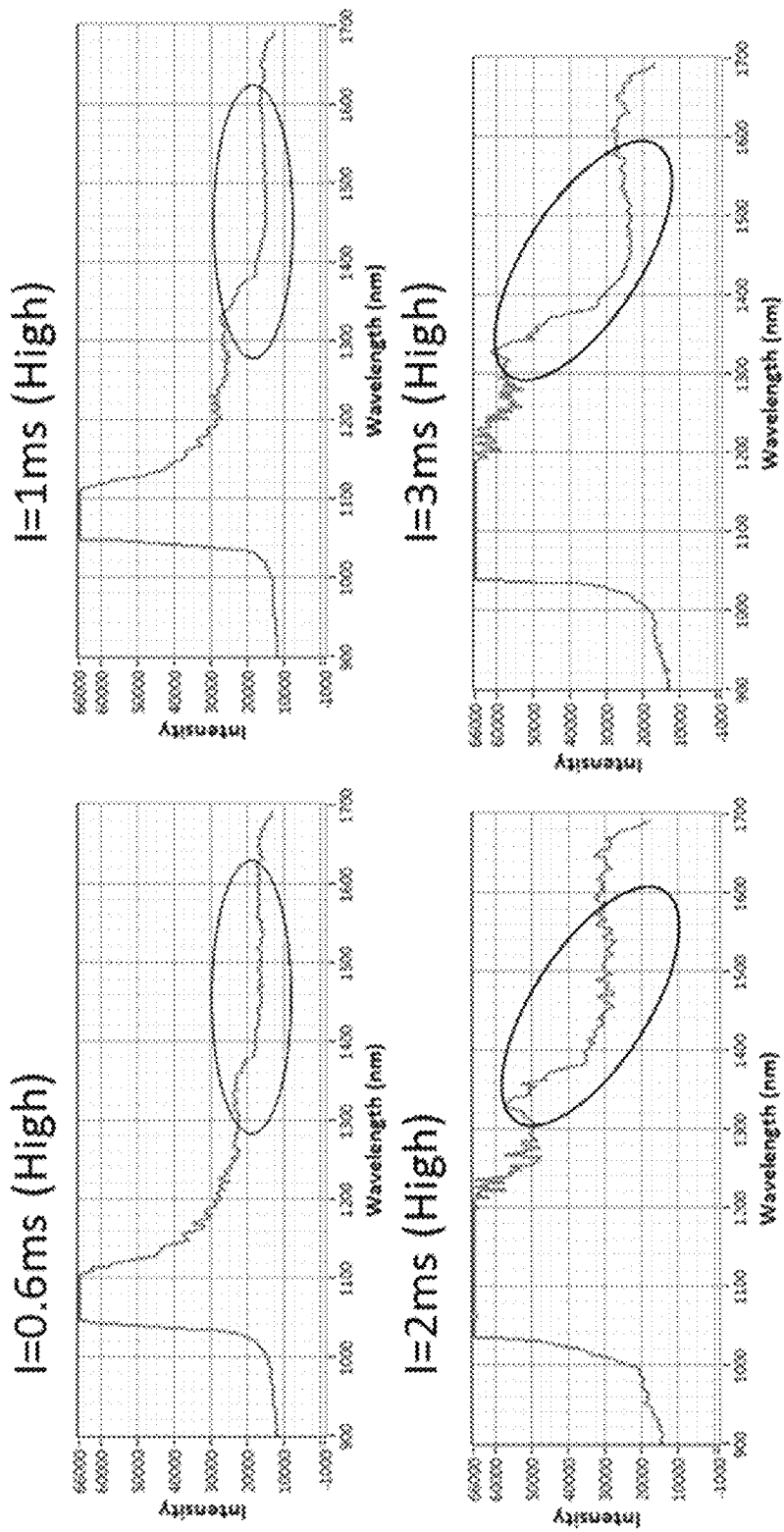
FIGS. 5 and 6 illustrate different results obtained by the proposed system with two different samples.
Figure 6:
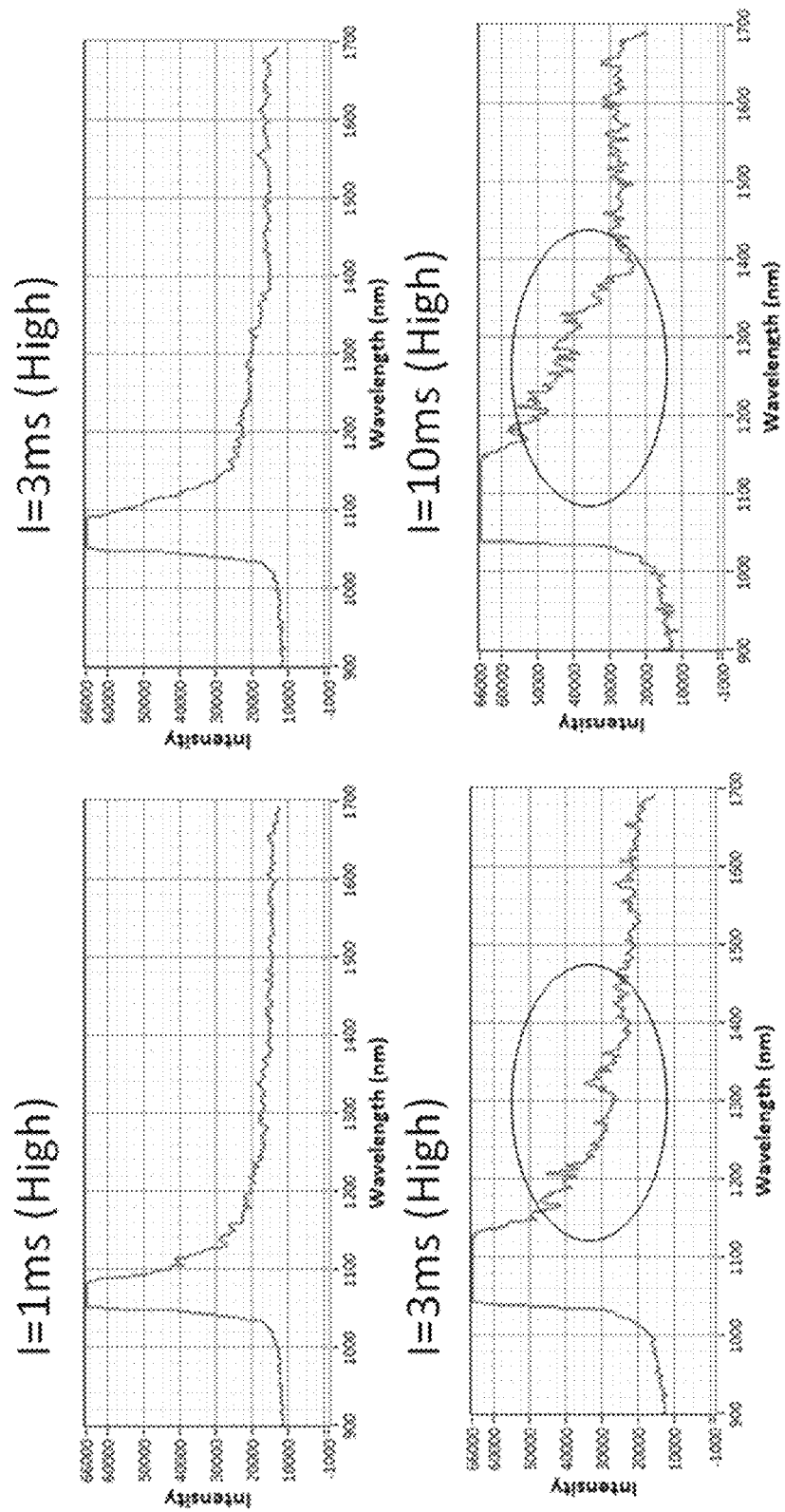

FIGS. 5 and 6 illustrate different results obtained with two different samples, an orange (FIG. 5) and a tomato (FIG. 6). The two samples were impinged by the light beam generated by the light source 10 and the system architecture depicted in FIG. 1 was used to measure the power collected in the central fiber 17 and in the external fibers 16 as well as the spectra with several acquisition times to compare them. In both of said figures, the left column illustrates the central fiber results whereas the right column illustrates the external fiber results. The difference of the spectra of the left and right column demonstrates that both the inside and surface of the sample 1 are independently, and also simultaneously, measured.

Figure 7:
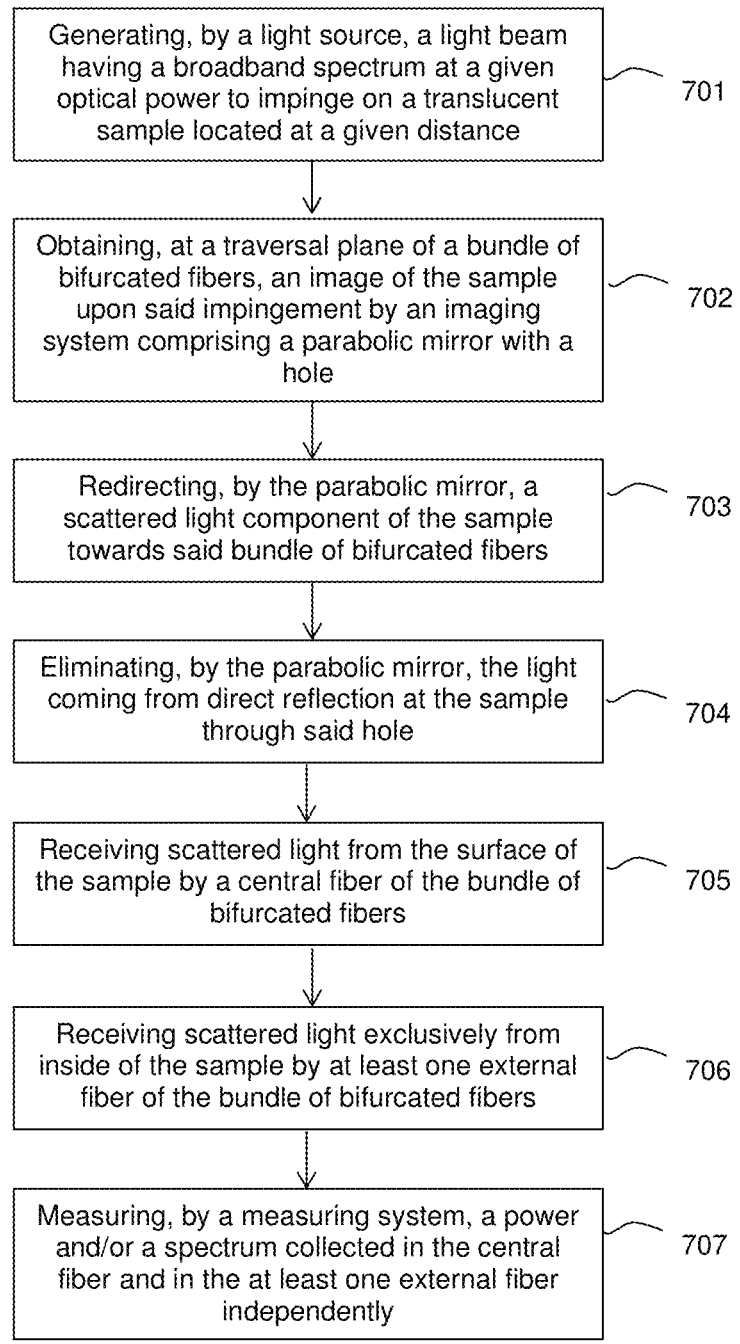
FIG. 7 is a block diagram illustrating an embodiment of a light inspection method of the surface and inside of a sample.

With reference now to FIG. 7, therein it is illustrated an embodiment of the proposed method. According to this particular embodiment, the light source 10 generates, step 701, a light beam having a broadband spectrum at a given optical power to impinge on the sample 1 located at a given distance. Then, step 702, an image of the sample 1 is obtained by the imaging system 20. At step 703, the parabolic mirror 21 redirects the scattered light component of the sample 1 towards the bundle of bifurcated fibers 15, eliminating the light coming from direct reflection at the sample 1 through its hole. The scattered light from the surface of the sample 1, step 705, is received by the central fiber 17 and the scattered light solely from the inside of the sample, step 706, is received by the external fiber(s) 16. Finally, the measuring system 30, step 707, measures the power and/or the spectrum collected in the central fiber 17 and in the external fiber(s) 16, independently.

The focal length of the parabolic mirror 21, the length/distance from the parabolic mirror 21 to the sample 1 and the length/distance from the parabolic mirror 21 to the bundle of bifurcated fibers 15 are selected such that the image of the sample 1 is formed in the transversal plane of the fiber bundle input.

While in the above description of the particular embodiments the sample has been indicated to be a food such as a fruit or a vegetable, the teachings of the invention are equally applicable to other types of samples such as recycling materials or products, wood materials or products, metals, a biological tissue, textiles, plastics, drugs or medicines, minerals, etc. this list not being limitative.

The scope of the present invention is defined in the following set of claims.

The invention claimed is:

1. A light inspection system of the surface and inside of a sample, the system comprising:
   a light source configured to generate a light beam having a broadband spectrum at a given optical power to impinge on a sample located at a given distance, said sample comprising a given translucency and absorption coefficients;
   a light capturing unit;
   an imaging system configured to obtain an image of said sample upon said impingement, said imaging system comprising a parabolic mirror with a hole, said parabolic mirror allowing:
   the passage of the light beam towards the sample via the hole,
   the redirection of a scattered light component of the sample towards said light capturing unit, and
   the elimination of the light coming from direct reflection at the sample through said hole;
   said light capturing unit including a bundle of bifurcated fibers comprising a central fiber and at least one external fiber, said central fiber being positioned to receive scattered light at least from the surface of the sample and said at least one external fiber being positioned at a given distance from the central fiber to receive scattered light exclusively from inside the sample; and
   a measuring system configured to measure a power and/or a spectrum collected independently in the central fiber and in the at least one external fiber,
   wherein said image of the sample being obtained at a traversal plane of the bundle of bifurcated fibers.

2. The system of claim 1, wherein said measuring system includes a spectrometer and a power measuring device each one adapted for measuring said power and said spectrum in the central fiber and in the at least one external fiber independently.

3. The system of claim 1, wherein the light source comprises one of:
   a supercontinuum laser light source comprising a light wavelength between 450 and 2400 nm;
   a visible enhanced supercontinuum source comprising a light wavelength below 450 nm; or
   a supercontinuum laser based in soft-glasses photonic crystal fibers providing emission ranges from 2 µm to 13 µm.

4. The system of claim 1, wherein the light source comprises a multiwavelength light source.

5. The system of claim 1, further comprising a plurality of external fibers in an annular formation around the central fiber.

6. The system of claim 5, wherein the plurality of external fibers are located at a same distance from said central fiber.

7. The system of claim 6, wherein the plurality of external fibers comprises at least three fibers.

8. The system of claim 1, wherein the imaging system further comprises an optical device located between the parabolic mirror and the sample, and configured to change and orient the direction of the light beam towards the sample, wherein the optical device comprises at least one of a galvanometric mirror or a polygonal rotating mirror.

9. The system of claim 8, further comprising one or more filters, located between the light source and the optical device, and configured to excite the sample with light of arbitrary spectral shape.

10. The system of claim 1, wherein the parabolic mirror is concave and having a focal length of approximately 101 millimeters with a 90° configuration.

11. The system of claim 1, further comprising one or more filters, located between the parabolic mirror and the bundle of bifurcated fibers, and configured to select a wavelength of the scattered light from the sample.

12. The system of claim 1, further comprising dispersive elements, located between the parabolic mirror and the bundle of bifurcated fibers, and configured to discriminate a wavelength of the scattered light from the sample.

13. A light inspection method of the surface and inside of a sample, comprising:
   generating, by a light source, a light beam having a broadband spectrum at a given optical power to impinge on a sample located at a given distance, said sample comprising a given translucency and absorption coefficients;

obtaining, at a traversal plane of a bundle of bifurcated fibers, an image of said sample upon said impingement by an imaging system comprising a parabolic mirror with a hole, said parabolic mirror allowing the passage of the light beam towards the sample through said hole;

redirecting, by the parabolic mirror, a scattered light component of the sample towards said bundle of bifurcated fibers, said bundle of bifurcated fibers comprised of a central fiber and at least one external fiber;

eliminating, by the parabolic mirror, the light coming from direct reflection at the sample through said hole;

receiving scattered light at least from the surface of the sample by said central fiber of the bundle of bifurcated fibers;

receiving scattered light exclusively from inside of the sample by said at least one external fiber of the bundle of bifurcated fibers; and measuring, by a measuring system, a power and/or a spectrum collected in the central fiber and in the at least one external fiber independently.

14. The method of claim 13, wherein the sample comprises a food, a recycling material/product, a wood material/product, a metal, a biological tissue, a textile, a plastic, a drug or a mineral.

\* \* \* \* \*